(12) United States Patent
Woodworth

(10) Patent No.: US 7,221,711 B2
(45) Date of Patent: May 22, 2007

(54) MULTILEVEL DATA ENCODING AND MODULATION TECHNIQUE

(76) Inventor: John R. Woodworth, 260 S. Reynolds St., Alexandria, VA (US) 22304

( * ) Notice: Subject to any disclaimer, the term of this patent is extended or adjusted under 35 U.S.C. 154(b) by 668 days.

(21) Appl. No.: 10/393,414

(22) Filed: Mar. 21, 2003

(65) Prior Publication Data

US 2003/0194017 A1 Oct. 16, 2003

Related U.S. Application Data

(60) Provisional application No. 60/367,496, filed on Mar. 27, 2002.

(51) Int. Cl.
*H04B 14/06* (2006.01)

(52) U.S. Cl. .................. 375/246; 375/253; 375/254; 375/264; 375/287; 375/337; 341/51; 341/56; 341/73

(58) Field of Classification Search ............. 375/246, 375/253, 254, 264, 281, 286, 287, 337; 341/50, 341/51, 52, 56–58, 73, 106
See application file for complete search history.

(56) References Cited

U.S. PATENT DOCUMENTS

| | | | |
|---|---|---|---|
| 3,230,310 A | 1/1966 | Brogle, Jr. | |
| 3,317,720 A | 5/1967 | Lender | |
| 3,369,181 A | 2/1968 | Braymer | |
| 3,723,880 A | 3/1973 | Van Gerwen | |
| 3,731,199 A * | 5/1973 | Tazaki et al. | 375/288 |
| 3,876,944 A | 4/1975 | Mack et al. | |
| 3,980,826 A | 9/1976 | Widmer | |
| 4,095,187 A | 6/1978 | Yoshida | |
| 4,408,189 A | 10/1983 | Betts et al. | |
| 4,528,550 A | 7/1985 | Graves et al. | |
| 4,606,046 A | 8/1986 | Ludwick | |
| 4,768,206 A | 8/1988 | Van Gerwen | |
| 5,661,758 A | 8/1997 | Long | |

FOREIGN PATENT DOCUMENTS

| | | |
|---|---|---|
| DE | 2213897 | 11/1973 |
| EP | 0226514 | 6/1987 |
| GB | 2014401 | 8/1979 |
| JP | 58-145259 | 8/1983 |
| WO | 83/00967 | 3/1983 |

* cited by examiner

*Primary Examiner*—Dac V. Ha
(74) *Attorney, Agent, or Firm*—Richard C. Litman

(57) ABSTRACT

The multilevel data encoding and modulation technique uses a pair of complementary logic sets. In its most basic form, the sets are binary sets each containing a line level for a logical one and a line level for a logical zero for a total of four logic levels. The encoding technique requires a polar change in the line level after every bit. An optional fifth level may be used in order to skew the frequency or to enable automatic gain control circuitry to ensure consistent level discrimination. The encoding technique may be used in a bipolar device, or a bias level may be applied to the signal for unipolar transmission. The encoding technique involves inverting the polarity of alternating bits, filtering out all odd harmonics, transmitting and receiving the waveform, and decoding the demodulated waveform by comparing the absolute value of the half-cycle peak-to-peak voltage gain to a predetermined table.

12 Claims, 5 Drawing Sheets

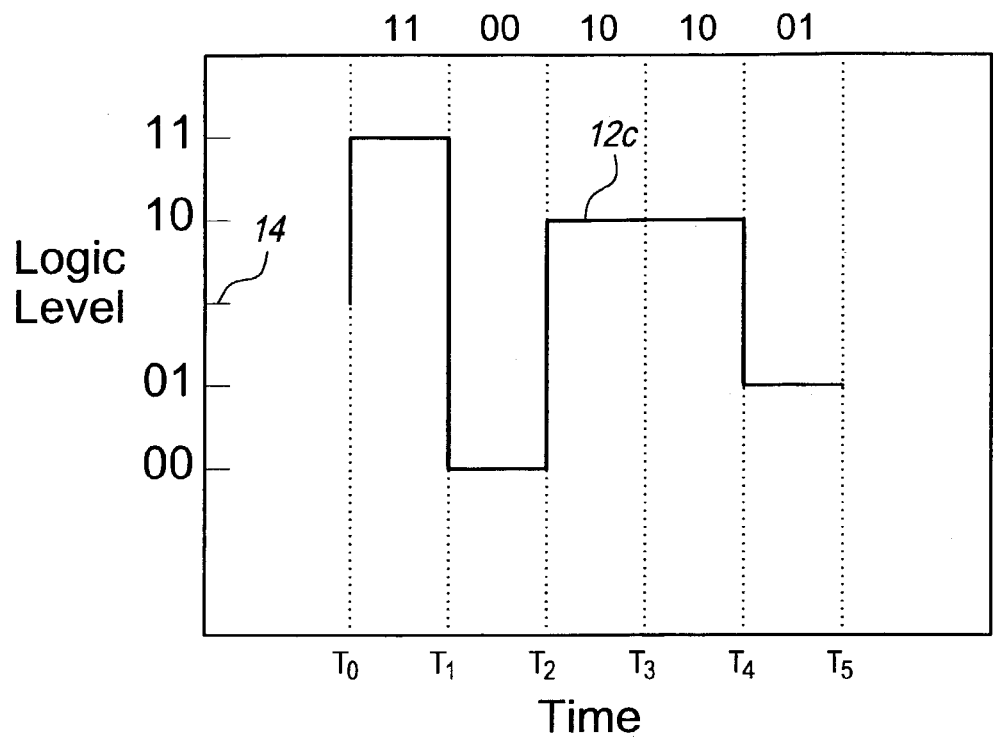
Fig. 1C *(Prior Art)*
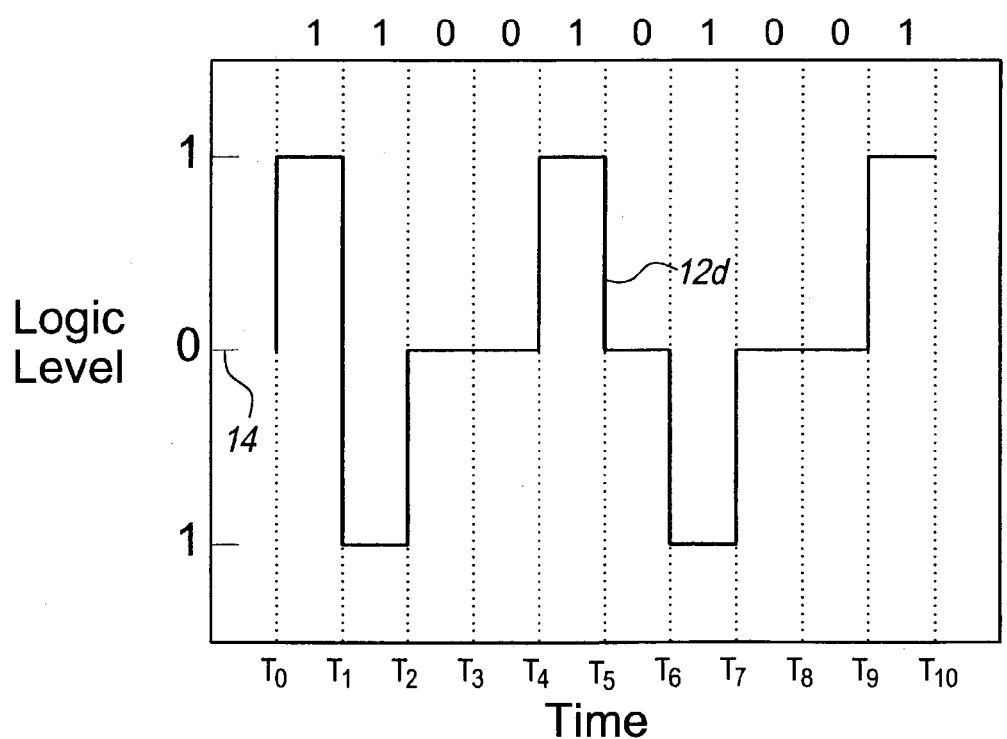
Fig. 1D *(Prior Art)*

US 7,221,711 B2

MULTILEVEL DATA ENCODING AND MODULATION TECHNIQUE

CROSS-REFERENCE TO RELATED APPLICATION

This application claims the benefit of U.S. Provisional Patent Application Ser. No. 60/367,496, filed Mar. 27, 2002.

BACKGROUND OF THE INVENTION

1. Field of the Invention

The present invention relates to methods for the transmission of digital data, and more particularly to a multilevel data encoding and modulation technique for telecommunications and data transmission.

2. Description of Related Art

Various techniques have been developed for encoding and modulating baseband signals for transmission over transmission lines, both wire cables and fiber optic, and for transmission in wireless applications. The simplest transmission technique is binary signaling over a single cable, with the information encoded in two voltage levels or symbol types. This method of transmission is limited by how fast the voltage level, or other symbol type, can be changed given the harmonic content of the baseband signal before the signal becomes distorted by noise, interference, etc. In order to increase data throughput, several multilevel techniques have been developed, one of which is tokenizing, which allows two or more bits to be encoded by a single timing interval. For example, in a quaternary signaling system, a first voltage level may represent a binary "1" followed by a second binary "1", a second voltage level may represent a "1" followed by a "0", a third level a "0" followed by a "1", and a fourth level a "0" followed by a "0".

Multilevel techniques permit faster transmission of data (twice as much data in the same bandwidth in a quaternary system), or the transmission of data at the same rate but in a smaller bandwidth (half the bandwidth in a quaternary system). One problem with multilevel signal techniques is that conventional multilevel signals contain a range of frequencies due to the varying bit patterns of the data bits. Consequently conventional multilevel signals occupy a greater bandwidth than necessary. Another problem is that they result in reduced noise and interference immunity as compared to binary signaling, as it becomes more difficult to distinguish between symbol states (voltage levels, frequencies, etc.). A third problem is that multilevel signals require more complex receiving equipment to demodulate and decode the signal.

The following patents show a representative sampling of different data transmission methods.

U.S. Pat. No. 3,230,310, issued Jan. 18, 1966 to A. P. Brogle, Jr., describes a "biternary" pulse code system with two trains of binary pulses in which one train is delayed by half the time interval of a pulse and added to the second train of pulses. U.S. Pat. No. 3,317,720, issued May 2, 1967 to A. Lender, teaches a polybipolar system with a complicated algorithm such that there is an odd number of multiple signal levels in which the center and all even number signal levels are spaces and all odd number signal levels are marks.

U.S. Pat. No. 3,369,181, issued Feb. 13, 1968 to N. B. Braymer, discloses a system with two levels to indicate mark and space, respectively, in which each bit is a doublet having positive and negative excursions of equal amplitude. U.S. Pat. No. 3,723,880, issued Mar. 27, 1973 to P. J. Van Gerwen, shows a system which includes a five level signal, but which does not require alternating positive and negative pulses.

U.S. Pat. No. 3,876,944, issued Apr. 8, 1975 to Mack et al., teaches a dibinary method for encoding nonsynchronous binary data to increase data transfer which manipulates binary data to form a three level output by randomly switching positive to negative to concentrate the signal in a lower frequency range. U.S. Pat. No. 3,980,826, issued Sep. 14, 1976 to A. X. Widener, describes a method for minimizing distortion in a bifrequency system by reducing the amplitude of low frequency bits in the latter part of the bit period.

U.S. Pat. No. 4,095,187, issued Jun. 13, 1978 to Y. Yoshida, shows a demodulation circuit for a quadrature amplitude modulation (QAM) multiphase system in which two modulated carrier waves are combined. U.S. Pat. No. 4,408,189, issued Oct. 4, 1983 to Betts et al., discloses a coding scheme for quarternary level signals which divides binary bits into words of length n bits and adds an n+1 bit to indicate which words are inverted in order to eliminate the D.C. component of the signal. U.S. Pat. No. 4,528,550, issued Jul. 9, 1985 to Graves et al., describes an improvement to the '189 Betts patent.

U.S. Pat. No. 4,606,046, issued Aug. 12, 1986 to J. J. Ludwick, shows a converter for doubling the channels on a transmission line from forty-eight to ninety-six by transmitting an unrestricted four-level pulse-amplitude modulated signal rather than a standard bipolar signal. U.S. Pat. No. 4,768,206, issued Aug. 30, 1988 to P. J. Van Gerwen, describes a complicated code scheme for transmitting digital data above voice.

U.S. Pat. No. 5,661,758, issued Aug. 26, 1997 to M. E. Long, teaches a method of encoding data on a carrier wave by coding the data as "disruptions" on the carrier wave, each disruption being characterized by the starting time in a wave period and by duration of the disruption. German Patent No. 2,213,897, published Nov. 27, 1973, describes a system for "automatic equalization" of multilevel signal systems.

United Kingdom Patent No. 2,014,401, published Jan. 17, 1979, discloses a pseudo-ternary system with a three level signal in which the third level is used to indicate two consecutive logic "1" or logic "0" bits. International Patent No. WO 83/00967, published Mar. 17, 1983, teaches an encoding scheme for communication between a controller and a disk drive or other memory device which uses a fixed bit interval with a positive pulse representing a logic "1" and a negative pulse representing a logic "0". When a logic "1" is followed by another logic "1", or a logic "0" is followed by another logic "0", the first bit interval contains a second pulse which has the same magnitude and duration but opposite polarity from the first pulse in the bit interval.

Japanese Patent No. 58-145259, published Aug. 30, 1983, shows an electrical circuit for shaping a waveform. European Patent No. 226,514, published Jun. 24, 1987, shows a carrier phase shift keying (PSK) or frequency shift keying (FSK) modulation device which operates on a duobinary signal.

None of the above inventions and patents, taken either singly or in combination, is seen to describe the instant invention as claimed.

SUMMARY OF THE INVENTION

The multilevel data encoding and modulation technique of the present invention uses a pair of complementary sets. In its most basic form, the set are binary and contains a line level for a logical one and a line level for a logical zero for a total of four line levels. The technique requires a polar change about a median level after every bit. An optional fifth line level may be used to skew the frequency or to enable the implementation of Automatic Gain Control (AGC) on the receive side to ensure consistent level discrimination. The encoding technique may be used in a bipolar device, or a bias level may be applied to the signal for unipolar transmission, e.g., in fiber optics. The modulation technique involves inverting the polarity of alternating bits about a median level, filtering out all odd harmonics to produce a sinusoidal waveform, transmitting and receiving the waveform, and decoding the demodulated waveform by correlating the absolute value of the voltage gain between the last two half-cycles with the decoded value of the last bit according to a predetermined table.

It will be noted that because the encoding technique of the present invention requires a polar change in the line level with each successive bit, a baseband signal encoded according to the present invention has a constant frequency, a phenomenon referred to herein as MonoFrequency Timing (MFT). With conventional encoding techniques, the procedure for calculating the minimum bandwidth required for passing an error free signal calls for assuming a square wave of alternating mark and space bits at the desired baud rate in bits per second, so that the minimum bandwidth required is equal to $0.5 \times 1/T_S$, where $T_S$ is the period of one bit. The bandwidth is then specified as all frequencies between 0 Hz and the frequency so calculated. The reason why all frequencies less than the calculated minimum are required is that the frequency of the baseband signal may vary depending on the pattern of data bits, the square wave simply representing a worst case scenario. However, since a baseband signal encoded according to the present invention is constant in frequency, the bandwidth is only limited by the practicality of building a bandpass filter which passes only the frequency of the baseband signal. If, e.g., a baseband signal encoded according to the present invention has a frequency of 250 Hz, and if a bandpass filter of less than one Hertz is used, then theoretically the channel can simultaneously pass a second baseband signal having a frequency of 249 Hz. Hence the encoding technique of the present invention is more bandwidth efficient than conventional encoding techniques.

The multilevel data encoding and modulation technique of the present invention has the advantage of greater immunity to noise and interference, since the logic levels invert polarity at regular intervals. The technique has the additional advantage that receiver circuitry for demodulating and decoding the signal has a simpler implementation than conventional multilevel data transmission techniques. A further advantage is gained by the optional skew logic level, which enables implementation of automatic gain control circuitry in the receiver for improved discrimination of logic levels.

Accordingly, it is a principal object of the invention to provide a multilevel data encoding and modulation technique for data transmission which results in improved bandwidth efficiency by producing a baseband signal having a constant frequency.

It is another object of the invention to provide a multilevel data encoding and modulation technique for data transmission having improved noise and interference immunity by requiring successive data symbols to have opposite polarities with respect to a median line level.

It is a further object of the invention to provide a multilevel data encoding and modulation technique requiring less complicated receiver circuitry than conventional multilevel encoding techniques due to alternating polarities of successive data symbols.

Furthermore another object of the invention is to enable frequency division multiplexing with additional waveforms by skewing the frequency of the output waveform.

Still another object of the invention is to improve the discrimination of logic levels in a multilevel data encoding and modulation technique for data transmission by providing a separate line level enabling implementation of an automatic gain control circuit in the receiver.

Yet another object of the invention is to provide a multilevel data encoding and modulation technique for data transmission having improved noise and interference immunity, thereby reducing the need for retransmission of data packets having errors in transmission.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1C is a diagram of logic levels versus time in a baseband signal encoded with a multilevel encoding technique of the prior art at the same information rate as the signal of FIG. 1A.

FIG. 1D is diagram of logic levels versus time in a baseband signal encoded with the alternate mark inversion technique of the prior art.

Similar reference characters denote corresponding features consistently throughout the attached drawings.

DETAILED DESCRIPTION OF THE PREFERRED EMBODIMENTS

Figure 1A:
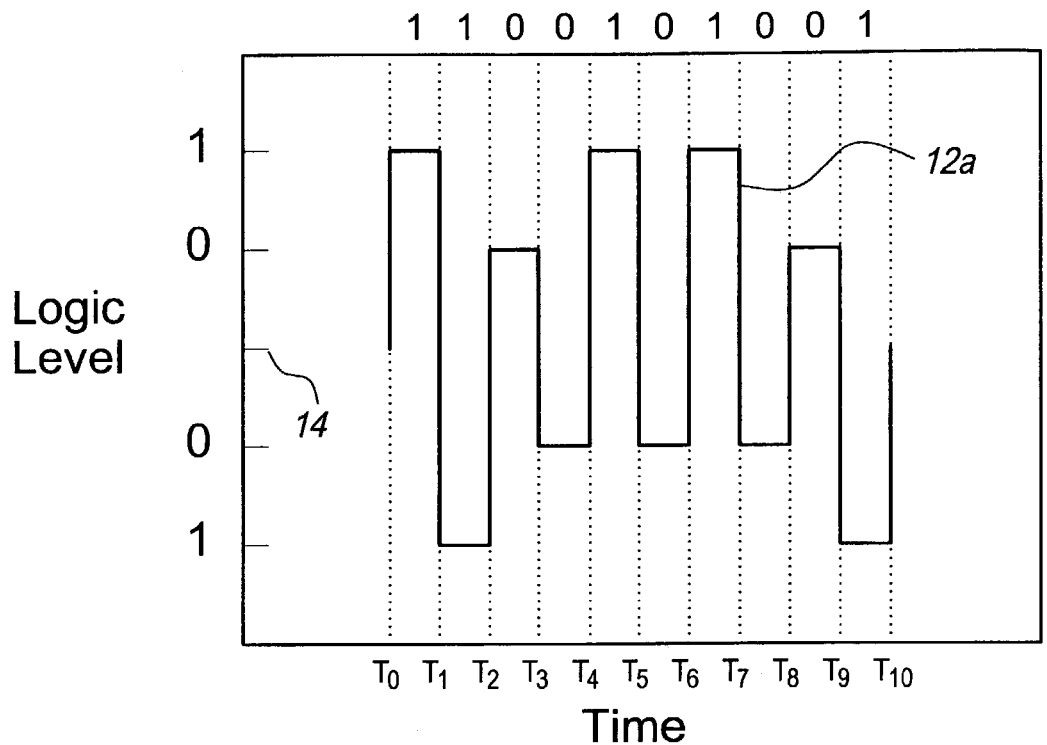
FIG. 1A is a diagram of logic levels versus time in a baseband signal encoded with the multilevel data encoding and modulation technique according to the present invention.
Figure 1B:
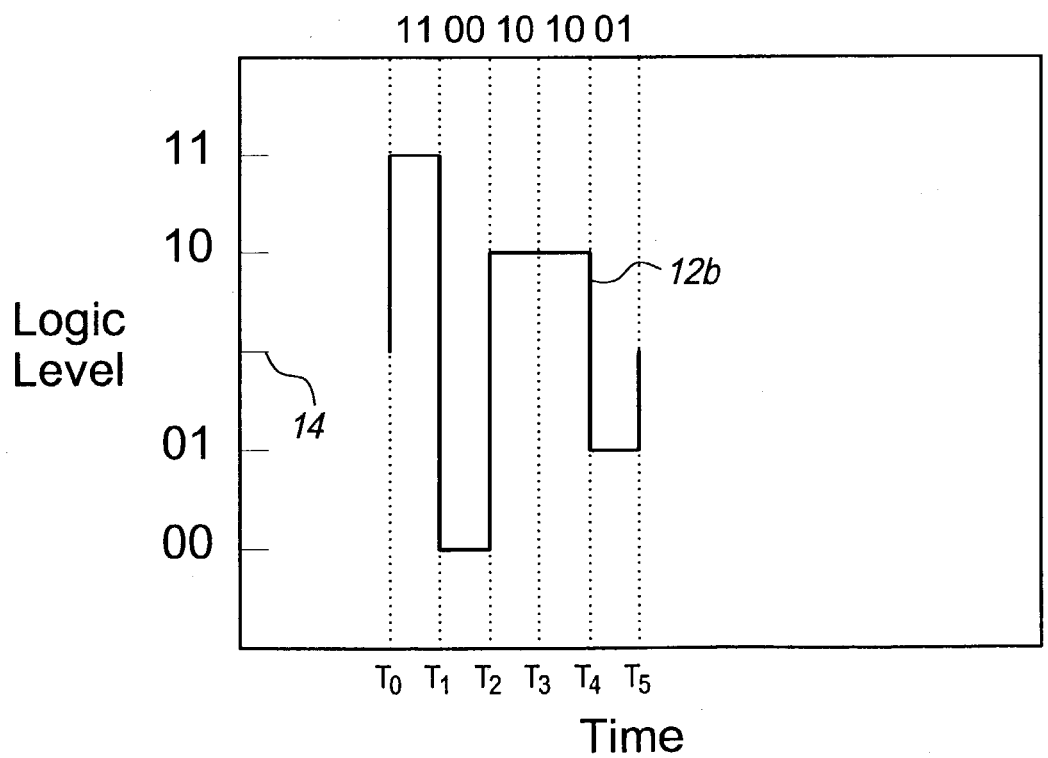
FIG. 1B is a diagram of logic levels versus time in a baseband signal encoded with a multilevel encoding technique of the prior art at the same symbol rate as the signal of FIG. 1A.

The present invention is a multilevel data encoding and modulation technique for the transmission of digital data either over a transmission line or by wireless transmission. FIG. 1A shows an exemplary baseband signal 12a encoded according to the technique of the present invention. As used herein, the term baseband signal refers to a signal of single frequency in the range from zero Hertz upward, which has not been modulated onto a carrier. FIG. 1A shows a sample bit stream, or data stream, in this case the binary stream 1100101001, encoded according to the technique of the present invention. FIGS. 1B–1D show the same binary stream encoded according to three multilevel encoding schemes known in the art for comparison purposes, resulting in the corresponding encoded signals 12b, 12c, and 12d, respectively.

Figure 2:
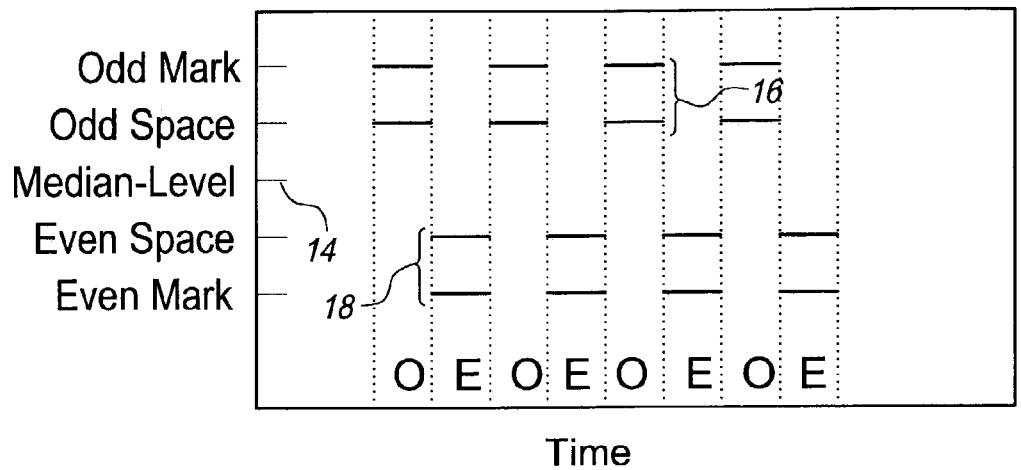
FIG. 2 is a diagram showing the logic levels assigned to odd and even numbered bits in a bit stream with the multilevel data encoding and modulation technique according to the present invention.

The multilevel encoding technique of the present invention utilizes two pairs of complementary line or logic levels. In the most basic implementation, each pair of complementary line levels consists of a binary set of logic levels, having a first logic level corresponding to a mark, or binary 1, and a second logic level corresponding to a space, or binary 0, for a total of four distinct logic levels. As shown more clearly in FIG. 2, the logic level spectrum has a median level 14 (labeled "Skew-Level" in FIG. 2 for a purpose described below). In a recommended implementation of the technique of the present invention, the space in the first pair 16 of complementary logic levels is offset from the median in a positive direction by a slight magnitude, while the mark is offset from the median by a more strongly positive magnitude. Preferably the mark is offset from the median by twice the magnitude of the offset of the space, or other integral proportional ratio, although this is not required. By contrast, the space in the second pair 18 of complementary logic levels is offset from the median in a negative direction by a slight magnitude, while the mark is offset from the median by a more strongly negative magnitude.

The logic levels will usually be the amplitude or voltage of the signal, although conceptually the logic levels may refer to variations of frequency about a median frequency. The present invention may be implemented using bipolar devices wherein the median logic level 14 would be equivalent to a ground potential. The present invention may also be implemented using monopolar device such as fiber optic and other transmission media incapable of reversing the polarity of the signal 12a about ground by applying a bias potential thereby raising the negative range to or just above the zero level.

In the encoding technique of the present invention, the bits in the input bit stream are divided into odd-numbered bits and even-numbered bits, so that the first bit in the stream is an odd bit, the second bit is an even bit, the third bit is an odd bit, etc. It is a rule of the encoding technique of the present invention that the odd-numbered bits is associated with one pair of complementary logic levels, while the even-numbered bits are associated with the other pair of complementary logic levels. In the drawings, the odd-numbered bits are associated with the first, or positive, pair 16 of mark and space levels, while the even-numbered bits are associated with the second, or negative, pair 18 of mark and space levels, although the reverse convention is equivalent and within the scope of the present invention. Thus, in FIG. 2 a negative mark or space never appears above an odd-numbered bit (symbolized by the letter O between the scale ticks on the Time axis), and a positive mark or space never appears above an even-numbered bit (symbolized by the letter E between the scale ticks on the Time axis).

Referring back to FIG. 1A, it will be seen that since the first bit in the binary stream 1100101001 is a binary 1, the signal 12a is encoded with a positive mark. The second bit is also a 1, and since the bit is even numbered, the signal 12a is encoded with a negative mark. The third bit is a 0, and since the bit is odd-numbered, the signal 12a is encoded with a positive space, etc. Each bit has alternating polarity so that the frequency of the signal 12a is constant, although the amplitude of the bits varies.

By contrast, FIG. 1B shows the same bit stream encoded with a conventional quaternary technique in which the period of each bit is the same as in signal 12a, but each bit encodes two bits of data instead of one, so that the resulting signal 12b has the same symbol rate as signal 12a, but transmits information at twice the rate as signal 12a. Thus the first two digits of the input data stream, 11, are encoded by the uppermost logic level, the next two bits, 00, are encoded by the lowest logic level, the third pair of bits, 10, are encoded by the upper one of the two intermediate levels, etc. The plateau in signal 12b opposite Logic Level "10" should be compared to the same bits as they are encoded in signal 12a. The flat plateau in signal 12b at Logic Level "10" encodes the sequence 1010. This plateau, in essence, doubles the period of the mark, and means that signal 12b encompasses a range of frequencies, thereby increasing the bandwidth of frequencies transmitted compared to signal 12a. If enough binary "10" pairs appear in succession, the receiver may interpret the plateau as a d.c. voltage level, thereby resulting in a bit error.

Alternatively, if a binary "10" in the input stream is either immediately preceded by or followed by a binary "11", the transition between symbol logic levels is low compared to signal 12a, leading to poorer discrimination in logic levels.

FIG. 1C illustrates another quaternary level encoding technique of the prior art in which the same input bit stream is encoded at the same information rate as signal 12a. It will be apparent by inspection that the period of each logic level in signal 12c is twice that of signal 12b, so that the frequency, and hence the bandwidth, is half that of signal 12b. The same observations with respect to the comparison of signal 12b with 12a apply here, i.e., the signal 12c encompasses a range of frequencies, the receiver may interpret a plateau in the signal 12c as a d.c. voltage, and transitions between successive symbol states or logic levels may be so short that discrimination in the receiver is poor.

FIG. 1D shows a ternary level signal according to an encoding technique conventionally known as alternate mark inversion. In this technique a space is always at the median level 14 and alternating marks have their polarity inverted. While this technique exhibits a sharp transition between mark and space, and between consecutive marks, consecutive spaces are at the same logic level with resulting plateaus. Consequently this technique also suffers from a range of frequencies in the encoded baseband signal 12d, as well as poor discrimination from d.c. caused by extended plateaus in the signal 12d.

The alternating polarity of the signal 12a encoded according to the present invention ensures that the encoded baseband signal 12a is constant in frequency. Since the frequency is constant, it is unnecessary to transmit a range of frequencies, thereby conserving bandwidth. The theoretical bandwidth of a signal encoded according to the multilevel data encoding and modulation technique of the present invention is thereby minimized to a single frequency which is half that of the frequency of the encoded data. As a practical matter, the bandwidth will be limited by the quality of the transmission medium and filtering devices. This efficiency of bandwidth utilization permits multiple signals to be transmitted in the bandwidth which would otherwise be occupied using conventional encoding techniques. For example, a 500 bps (bits per second) signal could be transmitted at 250 Hz, while simultaneously a 498 bps signal is transmitted at 249 Hz, a 496 bps signal is transmitted at 248 Hz, etc. The encoding technique of the present invention may be further combined with other developing techniques, such as Dense Wave Divided Multiplexing (DWDM), to achieve increases in throughput which are three to six orders of magnitude higher than existing technologies.

Figure 3:
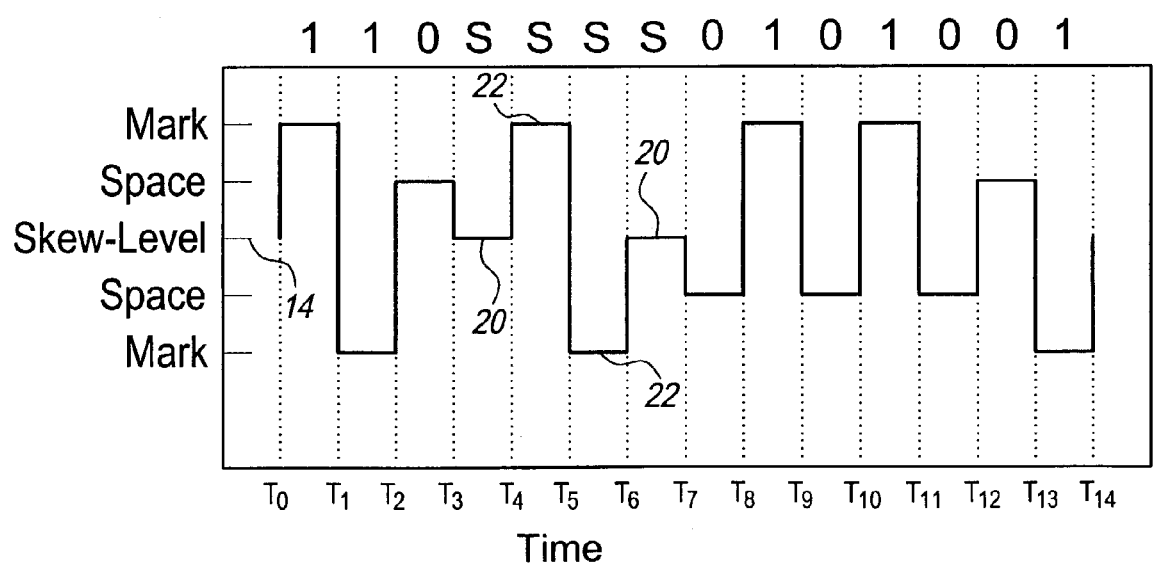
FIG. 3 is a diagram of a baseband signal encoded with the multilevel data encoding and modulation technique according to the present invention with skew bits added for timing purposes.

FIG. 3 illustrates a five level encoding technique, which I refer to as Quinque-Synch Modulation (QSM) (QSM is used loosely to refer to either a four level or five level signal encoded according to the present invention, although quinque is derived from the Latin word for "five"). The fifth logic level in QSM is at the median logic level 14, and is referred to as the skew-level. According to the technique of the present invention, the skew-level is used to slightly shift the frequency of the output bit stream by stuffing bits into the bit stream at predetermined intervals. As shown in FIG. 3, the preferred method requires two skew bits 20 separated by one or more 22 mark logic levels. By being able to skew the frequency of the output bit stream, multiple bit streams may be added to a single transmission medium, each bit stream having its own MonoFrequency Timing (MFT). In addition, by virtue of the fact that mark bits represent the maximum voltage excursion in either the positive or negative direction, skew-level implementation provides means to implement automatic gain control (AGC) on the receive side to ensure consistent level discrimination.

Figure 4:
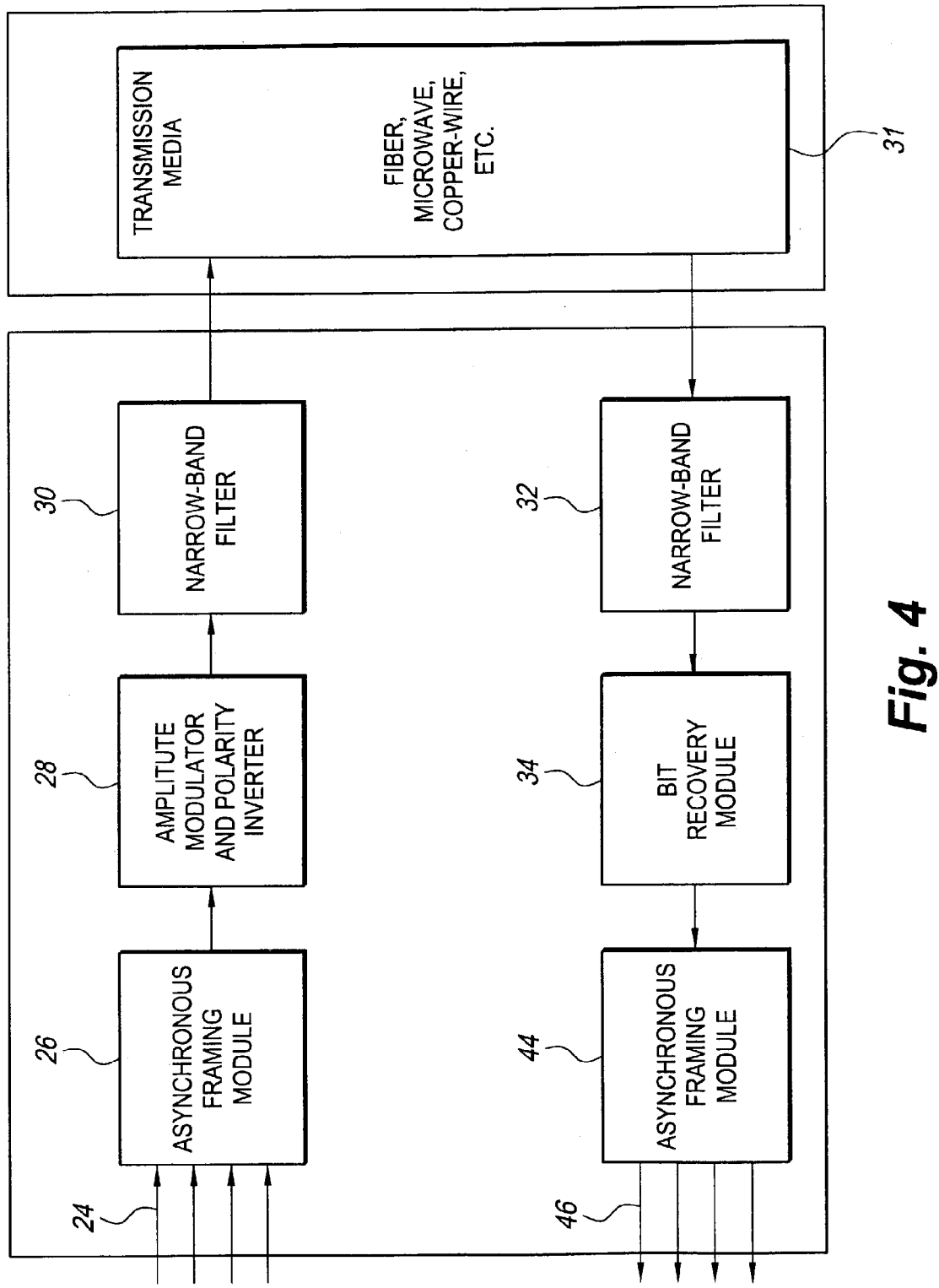
FIG. 4 shows a block diagram of a data transmission system for encoding-decoding and modulating-demodulating a signal with the multilevel data encoding and modulation technique according to the present invention.
Figure 5A:
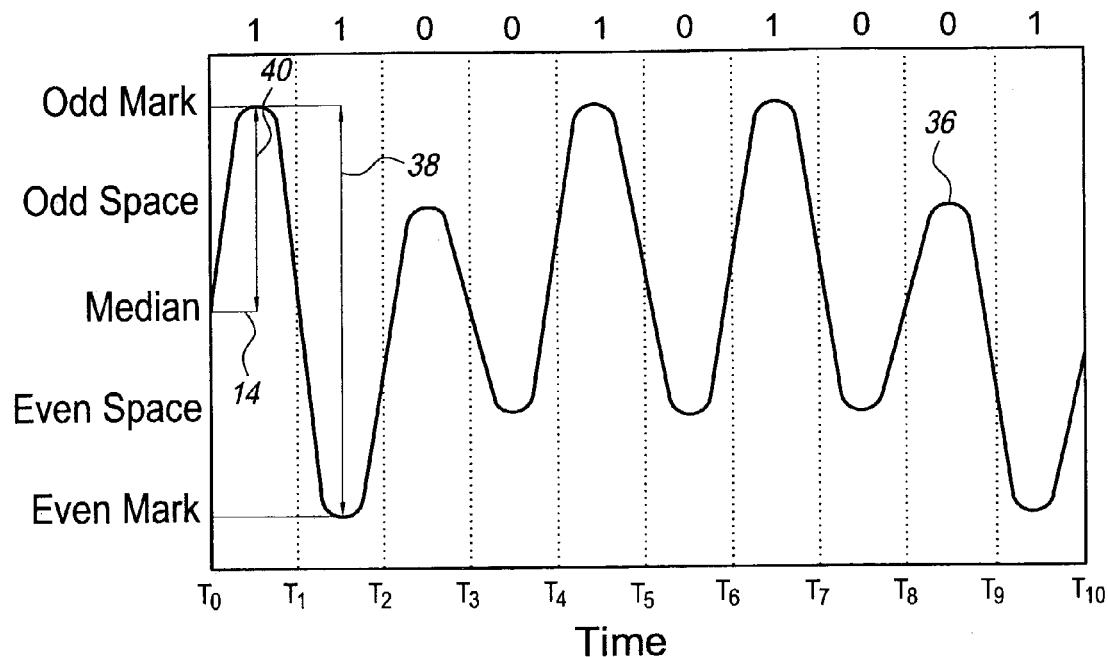
FIG. 5A shows a representative sinusoidal waveform of the baseband signal of FIG. 1A after processing by a filter to remove harmonics according to the present invention.

FIG. 4 shows a block diagram of a data transmission system for carrying out the multilevel data encoding and modulation technique of the present invention. A conventional data terminal equipment device (DTE not shown), e.g., a computer, supplies one or more bit streams 24 as input to the system. If frequency division multiplexing (FDM) or time division multiplexing (TDM) is used with the data encoding technique of the present invention, a plurality of input bit streams 24 will be supplied to an asynchronous framing module (AFM) 26 to frame the bit streams using conventional multiplexing techniques. The amplitude modulator and polarity inverter 28, receiving input from either the AFM 26 or directly from an input bit stream 24, splits the incoming bit stream into even-numbered and odd-numbered bits. The voltage level of each output bit is offset according to its logic level and the even-numbered bits are inverted into the opposite polarity from the odd-numbered bits. The levels may be a mark and space in a simple binary encoding scheme, or may be multiple levels in a tokenized encoding scheme where two or more bits are encoded in a single timing interval. Frequency skewing the signal for FDM implementation may be performed on the bit stream prior to the amplitude modulator and polarity inverter 28 or as part of this step as described in the discussion above relative to QSM and FIG. 3. The two opposing polarity bit streams are then recombined to form a single encoded bipolar baseband signal 12a, which is fed into a narrow band filter 30 which removes all odd harmonics from the square wave signal to form a sinusoidal waveform of fundamental frequency. The sinusoidal waveform is transmitted through the transmission media 31, which may be fiber optic cable, microwave radio, copper wire, or other data transmission media as known in the communications art. When the remote receiver receives the signal from the transmission media, the signal is processed by a narrow band filter 32 to remove noise and to ensure that only the frequency of interest is demodulated and decoded. If the baseband data had been multiplexed using FDM, the filter 32 provides frequency isolation from the FDM aggregate. FIG. 5A shows a representative waveform 36 after processing the bit stream 12a shown in FIG. 1A by the filter 32.

The filtered signal 36 shown in FIG. 5A is then processed by a bit recovery module 34 to recreate the original signal by correlating a preceding decoded bit value with the absolute value of the voltage gain 38 between adjacent half-cycle peaks according to Table 1.

TABLE 1

| Previous Decoded Bit Value | Absolute Value of ½ Cycle P-P Gain | Resulting Next Value |
| --- | --- | --- |
| 1 | Twice the Value of a Mark | 1 |
| 1 | Value of a Mark + Value of a Space | 0 |
| 0 | Twice the Value of a Space | 0 |
| 0 | Value of a Mark + Value of a Space | 1 |
| 0 | Value of a Space | Skew |
| Skew | Value of a Space | 0 |
| 1 | Value of a Mark | Skew |
| Skew | Value of a Mark | 1 |

Figure 5B:
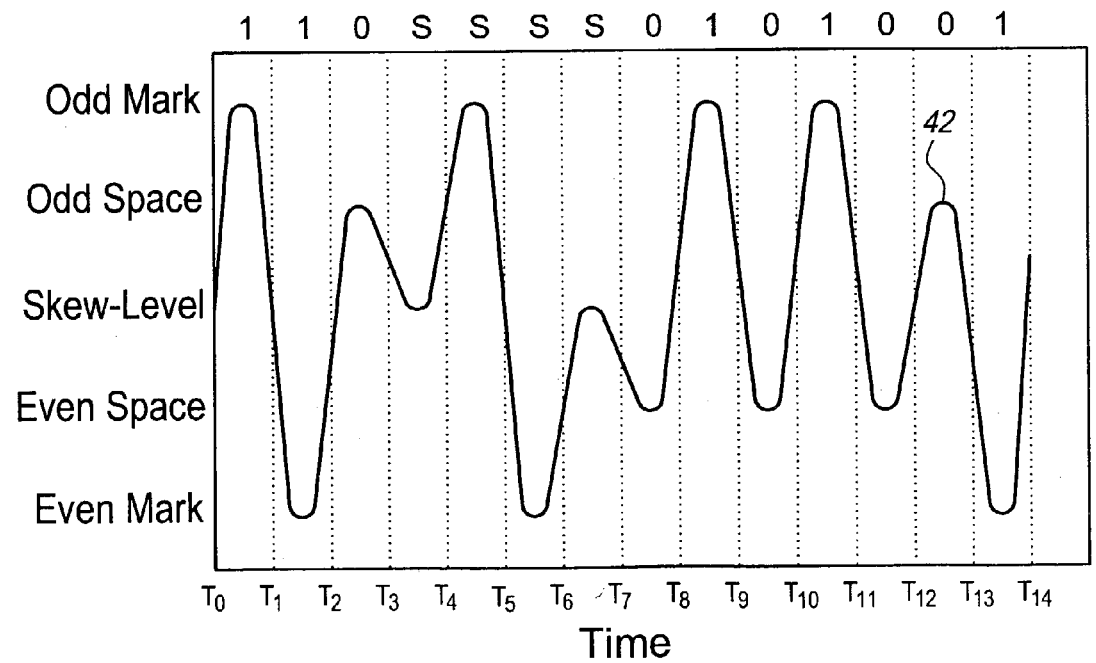
FIG. 5B shows a representative sinusoidal waveform of the baseband signal of FIG. 3 after processing by a filter to remove harmonics according to the present invention.

Table 1 is straightforward and may be easily interpreted by one skilled in the art. For example, referring to the first row, if the previous bit had a value of binary 1 (a mark), and the magnitude of the voltage change from the previous half-cycle peak to the current half-cycle peak (of the opposite polarity) 38 is two times the absolute value of the voltage offset 40 of a binary 1 measured from the median 14, then the current bit has a value of binary 1 (a mark). The remaining rows are interpreted in similar fashion. Table 1 may be easily extrapolated to include multilevel encoding schemes such as the signal 12b shown in FIG. 1B. It will be noted that the absolute gain always has a magnitude greater than the offset of a space from the median 14 and that the polarity of the received signal always alternates with successive bits. The combination of these two factors combine to provide improved discrimination of mark and space, thereby improving noise and interference immunity. If multiplexing is utilized, the output of the bit recovery module 34 is processed by an AFM 44 which removes skew bits if introduced by the AFM 26 and demultiplexes the signal to fan out a plurality of output signals 46 identical to the input signals 24; otherwise the bit recovery module 34 outputs a single signal identical to the input signal. The filtered signal 42 shown in FIG. 5B represents the waveform generated as a result of the bit stream with skew bits implemented as shown in FIG. 3.

For wireless transmission, the system may use conventional techniques for modulating the output of the narrow band filter 30 onto a carrier frequency by amplitude modulation, frequency modulation, phase modulation, and other conventional modulation techniques.

It is to be understood that the present invention is not limited to the sole embodiments described above, but encompasses any and all embodiments within the scope of the following claims.

I claim:

1. A multilevel data encoding and modulation method for data transmission of a bit stream sequence of binary data, comprising the steps of:
   (a) separating a bit stream sequence of binary data into odd-numbered bits and even-numbered bits based upon a bit's order in the sequence;

(b) assigning a voltage level to the odd-numbered bits from a first set of voltage levels, the first set having a unique voltage level correlating to each available logic level;

(c) assigning a voltage level to the even-numbered bits from a second set of voltage levels, the second set having a unique voltage level correlating to each available logic level, wherein the second set of voltage levels is symmetrically disposed about a median level from the first set of voltage levels; and (d) combining the voltage levels assigned to the odd-numbered bits with the voltage levels assigned to the even numbered bits in order to form an aggregate bit stream, successive bits in the bit stream alternately disposed about the median voltage level;

whereby said bit stream defines a baseband signal having a constant frequency.

2. The method of claim 1, further comprising the step of skewing the output frequency of said baseband signal to a higher frequency.

3. The method of claim 1, further comprising the step of activating automatic gain control circuitry.

4. The method of claim 1, further comprising the step of recreating said bit stream sequence at a remote receiver by correlating the logic value of a first decoded bit with the absolute value of the logic difference between half-cycle peaks according to a predetermined pattern.

5. A multilevel data encoding and modulation system for efficient use of bandwidth in a data transmission channel, comprising:

(a) means for separating said input bit stream sequence of binary data into odd-numbered bits and even-numbered bits based upon a bit's order in the sequence;

(b) means for assigning a voltage level to the odd-numbered bits from a first set of voltage levels, the first set having a unique voltage level assigned to each logic level;

(c) means for assigning a voltage level to the even-numbered bits from a second set of logic levels, the second set having a unique voltage level correlating to each logic level, wherein the second set of voltage levels is symmetrically disposed about a median logic level from the first set of voltage levels; and (d) means for combining the voltage levels assigned to the odd-numbered bits with the voltage levels assigned to the even numbered bits in order to form an aggregate bit stream, successive bits in the bit stream alternately disposed about the median voltage level;

whereby said bit stream defines a baseband signal having a constant frequency.

6. The system of claim 5, further comprising means for recreating said bit stream sequence at a remote receiver by correlating the logic value of a first decoded bit with the absolute value of the voltage difference between half-cycle peaks according to a predetermined pattern.

7. The system of claim 5, further comprising means for skewing the output frequency of said baseband signal to a higher frequency.

8. A multilevel data transmission method, comprising the steps of:

(a) creating a multilevel amplitude modulated, monofrequency baseband signal from an encoded input bit stream sequence;

(b) filtering said baseband signal of odd harmonics thereby creating a sinusoidal waveform;

(c) transmitting said sinusoidal waveform to a remote destination;

(d) remotely receiving said sinusoidal waveform;

(e) filtering unwanted noise and harmonics from said received sinusoidal waveform; and (f) recreating said bit stream sequence from said filtered received sinusoidal waveform.

9. The method of claim 8, wherein (a) further comprises the steps of:

(i) separating a bit stream sequence of binary data into odd-numbered bits and even-numbered bits based upon a bit's order in the sequence;

(ii) assigning a voltage level to the odd-numbered bits from a first set of voltage levels, the first set having a unique voltage level correlating to each available logic level; and (iii) assigning a voltage level to the even-numbered bits from a second set of voltage levels, the second set having a unique voltage level correlating to each available logic level, wherein the second set of voltage levels is symmetrically disposed about a median level from the first set of voltage levels.

10. The method of claim 8, further comprising the step of skewing the output frequency of said baseband signal to a higher frequency.

11. The method of claim 8, further comprising the step of activating automatic gain control circuitry.

12. The method of claim 8, further comprising the step of recreating said bit stream sequence at a remote receiver by correlating the logic value of a first decoded bit with the absolute value of the logic difference between half-cycle peaks according to a predetermined pattern.

* * * * *